(12) United States Patent
Hanebeck

(10) Patent No.: US 8,203,435 B2
(45) Date of Patent: *Jun. 19, 2012

(54) TRIGGERING DOCUMENT GENERATION USING RFID TAGS

(75) Inventor: Hanns-Christian Leemon Hanebeck, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 1214 days.

This patent is subject to a terminal disclaimer.

(21) Appl. No.: 11/741,392

(22) Filed: Apr. 27, 2007

(65) Prior Publication Data

US 2008/0266096 A1 Oct. 30, 2008

(51) Int. Cl.
*H04Q 5/22* (2006.01)
(52) U.S. Cl. ...................................................... 340/10.5
(58) Field of Classification Search .............. 340/7.51, 340/10.1, 10.51, 10.41, 10.3, 572.4
See application file for complete search history.

(56) References Cited

U.S. PATENT DOCUMENTS

| | | | |
|---|---|---|---|
| 6,249,227 B1 | 6/2001 | Brady et al. | |
| 6,268,796 B1 | 7/2001 | Gnadinger et al. | |
| 6,360,208 B1 | 3/2002 | Ohanian et al. | |
| 6,802,659 B2 * | 10/2004 | Cremon et al. | 400/76 |
| 7,035,877 B2 | 4/2006 | Markham et al. | |
| 7,187,462 B2 | 3/2007 | Oakeson et al. | |
| 7,204,409 B2 | 4/2007 | Kumar et al. | |
| 7,525,434 B2 | 4/2009 | Batra | |
| 7,567,179 B2 | 7/2009 | Stephensen et al. | |
| 7,623,036 B2 | 11/2009 | Onderko et al. | |
| 7,752,980 B2 | 7/2010 | Muirhead | |
| 7,764,191 B2 | 7/2010 | Hall et al. | |
| 2005/0099270 A1 | 5/2005 | Diorio et al. | |
| 2005/0271250 A1 | 12/2005 | Vallone et al. | |
| 2006/0109123 A1 | 5/2006 | Carrender | |
| 2006/0163338 A1 | 7/2006 | Allen et al. | |
| 2006/0186998 A1 | 8/2006 | Lin et al. | |
| 2007/0012602 A1 | 1/2007 | Baldassari et al. | |
| 2008/0084317 A1 | 4/2008 | Gakhar et al. | |
| 2008/0266094 A1 | 10/2008 | Hanebeck | |
| 2008/0266095 A1 | 10/2008 | Hanebeck | |
| 2008/0266096 A1 | 10/2008 | Hanebeck | |

OTHER PUBLICATIONS

Hanebeck, Hanns-Christian; recent reply/amendment to the first Office Action in related U.S. Appl. No. 11/741,340, filed Apr. 27, 2007.

USPTO; examination correspondence from filing date to Jan. 12, 2010 in related U.S. Appl. No. 11/741,340, filed by Hanns-Christian Hanebeck on Apr. 27, 2007.

(Continued)

*Primary Examiner* — Vernal Brown
(74) *Attorney, Agent, or Firm* — Robert H. Frantz; David A. Mims, Jr.; John R. Pivnichny

(57) ABSTRACT

A system and related methods for dynamically re-configuring a radio frequency identification tag reader, engaging software business processes, or combinations of both, using a radio-frequency-readable configuration tag which physically associated with one or more RFID-tagged articles in a physical handling flow. The configuration tag reader is positioned prior to a radio frequency identification tag reader in said material handling flow, which allows the configuration reader to read the contents of the configuration tags before the articles reach the identification tag reader. Based on the contents of the read configuration tags, one or more document generators are engaged, and optionally one or more business processes are initiated, and optionally one or more reader system hardware configuration changes are implemented.

20 Claims, 15 Drawing Sheets

OTHER PUBLICATIONS

IBM, "IBM Service Oriented Architecture", downloaded from http://www.306.ibm.com/software/solutions/soa/soaibm.html?S_TACT+107AG01W&S_CMP=ca on Mar. 8, 2007.

EXAMCRAM, "RFID Interrogation Zone Basics", downloaded on Mar. 29, 2007 from http://www.examcram2.com/articles.

RFID 101.COM, "Info Guide to Radio Frequency Identification (RFID) Technology", downloaded on Mar. 29, 2007 from http://www.rfid-101.com.

USPTO; Examination Correspondence from a Related U.S. Appl. No. 11/741,340, filed Apr. 27, 2007 by Hanns-Christian Leemon Hanebeck.

USPTO; Examination Correspondence in a related U.S. Appl. No. 11/741,367, filed Apr. 27, 2007; by Hanns-Christian Leemon Hanebeck.

USPTO; Examination Correspondence from a Related U.S. Appl. No. 11/741,367, filed Apr. 27, 2007 by Hanns-Christian Leemon Hanebeck.

USPTO; Examination Correspondence from a Related U.S. Appl. No. 11/741,392, filed Apr. 27, 2007 by Hanns-Christian Leemon Hanebeck.

USPTO, recent examination correspondence in related U.S. Appl. No. 11/741,367, filed Apr. 27, 2007, by Hanns-Christian Leemon Hanebeck.

USPTO;Examination Correspondence from a Related U.S. Appl. No. 11/741,367, filed Apr. 27, 2007 by Hanns-Christian Leemon Hanebeck.

Hanebeck, H.; recent examination correspondence in related U.S. Appl. No. 11/741,340, filed Apr. 27, 2007.

USPTO; recent examination correspondence from related U.S. Appl. No. 11/741,340, filed Apr. 27, 2007 by Hanns-Christian Leemon Hanebeck.

Hanebeck; recent after-allowance amendment filed in related U.S. Appl. No. 11/741,340, filed Apr. 27, 2007 by Hanns-Christian Hanebeck.

* cited by examiner

TRIGGERING DOCUMENT GENERATION USING RFID TAGS

BACKGROUND OF THE INVENTION

1. Field of the Invention

The present invention relates generally to Radio Frequency Identification technologies, and more specifically to methods for using RFID tags to initiate selected business processes.

2. Background of the Invention

Whereas the determination of a publication, technology, or product as prior art relative to the present invention requires analysis of certain dates and events not disclosed herein, no statements made within this Background of the Invention shall constitute an admission by the Applicants of prior art unless the term "Prior Art" is specifically stated. Otherwise, all statements provided within this Background section are "other information" related to or useful for understanding the invention.

Many environments in which a number of items are handled have been enhanced by the addition of Radio Frequency Identification ("RFID") technologies. Small "tags" are affixed to items or within their packaging which allow wireless, and often touch-free, "reading" of the tags' information. Individual products are often provided with an RFID tag, containing data identifying the product, the manufacturer, and even a serial number for the particular item. When a tagged item is "scanned", it passes near an RFID reader, which emits a radio frequency signal to power the embedded integrated circuit in the RFID tag, and causes the RFID tag to wirelessly transmit this data. The RFID reader then receives the data, and routes it to a computer system, such as an electronic cash register or inventory control system.

RFID tags have become useful in large scale material handling, such as in manufacturing, assembly, packaging, shipping, and receiving operations, such as those shown in FIG. 5a. In this illustration, a single tagged item (51) travels on a conveyor belt or track (50), passing by an RFID reader (55). The tagged items may also be contained in small groups, such as a crate case (52), or in an even larger container of items such as a palletized gross (53).

In such a bulk handling situation, the speed of the conveyor (50) is usually set to the fastest possible speed at which the RFID tags of individual items (51) as well as all of the tags on items within the bulk packaging (51, 52) can be accurately read by the RFID reader (55). The RFID information is collected and processed by various common systems, such as inventory control systems, billing systems, etc.

In some scenarios, human operators, assemblers, service personnel, or the like are stationed along side the conveyor. These persons may have duties such as visually inspecting the items as they pass, performing an assembly action, performing a packing operation, or even performing a repair operation.

For handling of higher value items, and especially when human operators are part of the environment, video surveillance (54) may be provided in order to assure careful handling of delicate items, to reduce theft or pilfering, and to allow for centralized management of a work area, such as a production floor or shipping and receiving bay.

SUMMARY OF THE INVENTION

The present invention includes system embodiments as well as methods for improving and automating certain changes of hardware configurations for RFID-based material handling systems, and for triggering business processes according to configuration tag information.

For simplicity purposes, the following description will be made according to an embodiment of the invention in which a first RFID tag is affixed to a container, carton, or crate, holding a number of items, each of which is also provided with an RFID tag. The first RFID tag (the one attached to the bulk container) will be referred to as an RF Configuration Tag, or RFCT. The RFCT may be of the same type or a different type of RFID device from the RFID tags on the individual items. In other embodiments of the invention, both the RFCT and RFID tags can be affixed to an individual item, and optionally the RFCT and RFID may be the same tag device storing two sets of information (e.g. configuration information and identification information).

The identification tag provides a unique identifier for each item, while the configuration tag can point to specific hardware configuration(s) to implement, to one or more processes to initiate, to an information sharing configuration to be engaged, to one or more documents to be generated, or a combination of these triggered actions. For example, a specific hardware configuration—often referred to as a hardware profile—can be exchanged for another one based on a RFCT read. This can be accomplished by reading the configuration tag, requesting a set of hardware configurations recorded in a predefined profile and activating a hardware profile. Alternatively, or in conjunction with a hardware profile implementation, reading of a specific RFCT can trigger execution of one or more automated business processes or document generators.

BRIEF DESCRIPTION OF THE DRAWINGS

The following detailed description when taken in conjunction with the figures presented herein provide a complete disclosure of the invention.

DETAILED DESCRIPTION OF THE INVENTION

The inventor of the present and related inventions has recognized problems unaddressed in the art regarding configuration of RFID-based systems, especially as applied to material handling.

The present invention aims to solve a business problem which is not yet widely recognized. It persists in all those situations where radio-frequency identification ("RFID") technologies are applied in a way that requires flexibility of the system configuration in regard to hardware, software and information reporting.

Today, without the invention, RFID-based material handling systems are static in their configuration, and they are trained to perform a certain function within the narrow context of a single business process.

For example, RFID equipment may be installed and configured to only scan pallets or boxes on a conveyor belt. It is not easy—in many instances simply impossible—to freely adjust the configuration of an RFID system once it is set. For example, to allow for increased speed of the conveyor system, the conveyor motor controls must be manually adjusted, and the position or distance from the RFID reader to the conveyor belt may need to be manually decreased (e.g. decreasing distance between the tagged items and the reader generally increase the accuracy and speed at which the tags can be read). Or, if larger containers holding a greater quantity of tagged items are to be handled on an existing system, the conveyor speed may have to be manually decreased, and the RFID antenna may have to be manually repositioned.

Further, in most handling systems, video surveillance is continuous if present (e.g. capturing images during important times as well as irrelevant times), which may lead to capturing more video data than required, thereby increasing cost of the system. Or, due to this cost, video surveillance may be omitted from the system configuration altogether.

Such inflexible RFID systems subsequently cannot adjust when items other than what they were trained for pass through. Likewise, RFID-enabled business processes will not change based on the context of a given transaction.

The present invention enables a RFID system that can be flexibly, and automatically reconfigured in a multiplicity of ways to always execute a best-possible configuration (or business process) based on external information attached to the objects in a transaction.

Figure 5A:
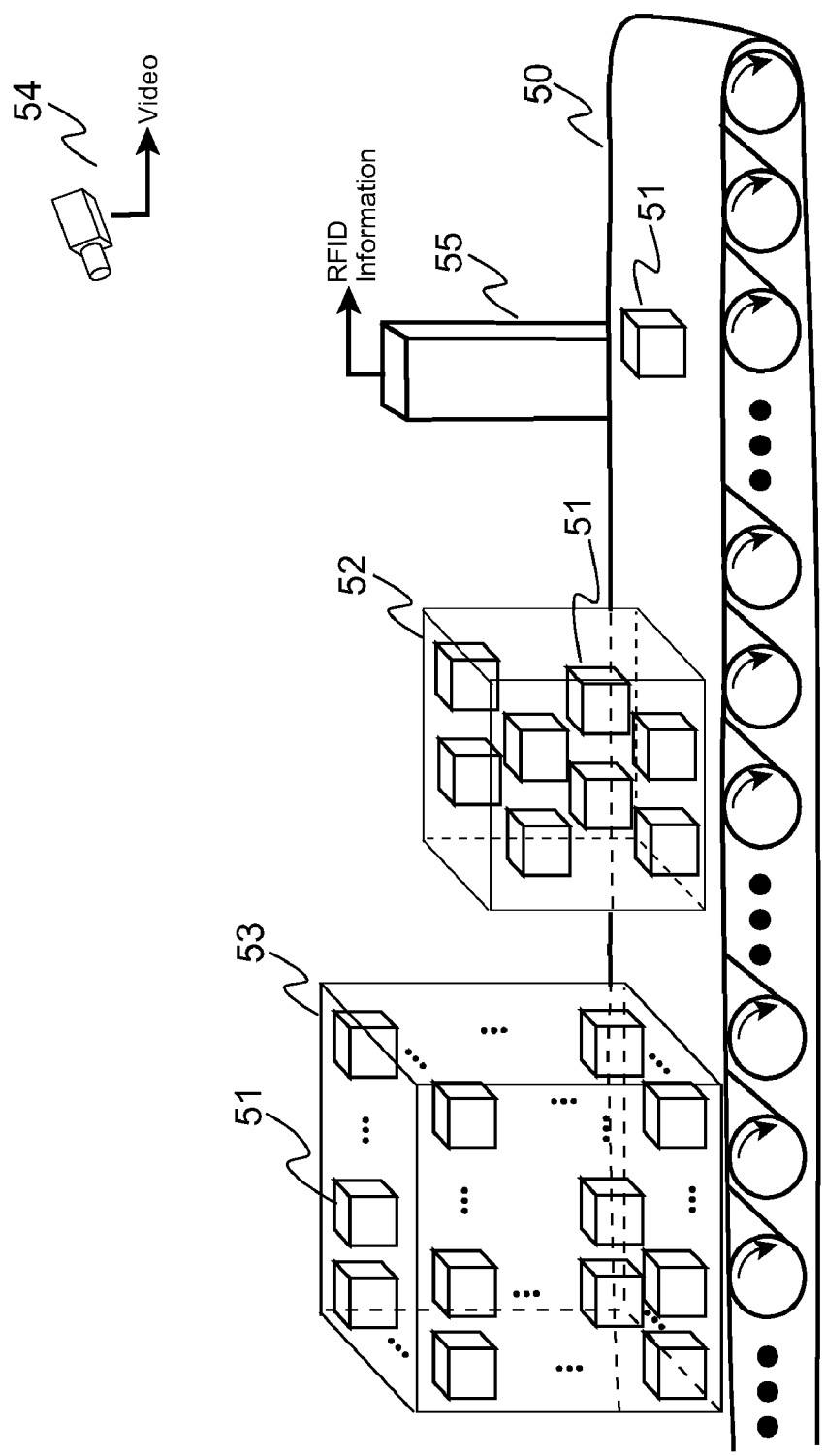
FIGS. 5a and 5b illustrates a material handling system and the physical arrangement of components.
Figure 5B:
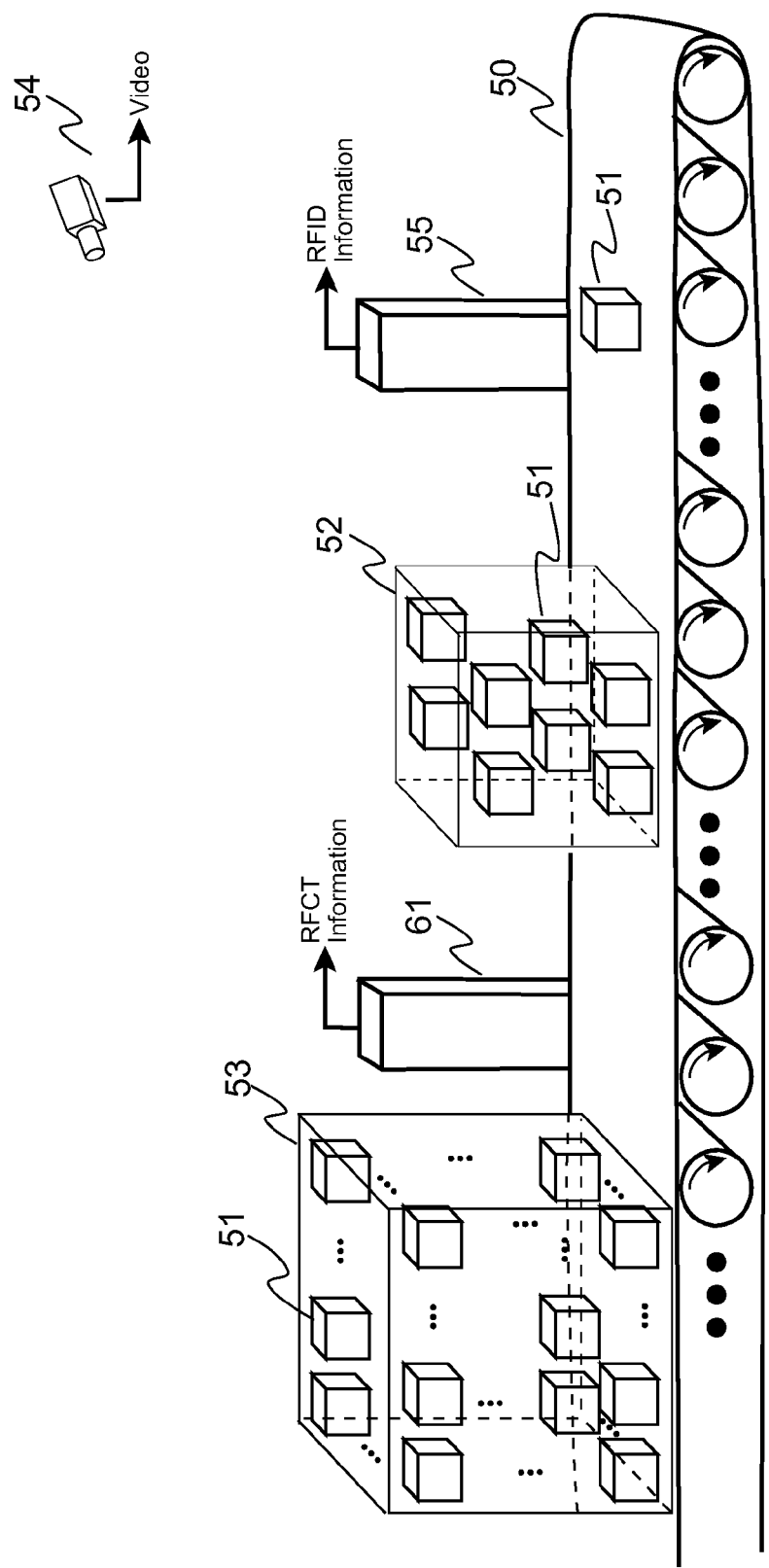

According to the invention, Radio Frequency Configuration Tags ("RFCT") are utilized to communicate from a handled item to a controlling system which has certain controls that can be varied and set per configuration profiles. The item passes by an RFID controller (61) as shown in FIG. 5*b*, the information in the RFCT is read, certain logical processes are performed to determine any configuration changes to be implemented, any business processes to be initiated or terminated, or both. Then, certain configuration changes are automatically implemented, such as speeding up or slowing down the conveyor speed, repositioning an RFID reader using servo motors, or enabling/disabling data capture from a variety of sensors, such as video cameras, based on sensor inputs, such as motion sensors, as will be described in more detail in the following paragraphs. The RFCT are preferably affixed to the multiple-item containers, and are preferably a separate RFID-like tag from the RFID tag used to identify actual items.

However, in alternate embodiments, the RFCT may be integrated into the RFID tags, and may be affixed directly to individual items.

One advantage of the invention is that the system can flexibly reconfigure itself based on the objects and containers of objects that pass through it without the necessity for a user input, manual adjustments, or maintenance processes. In other words, the RFCT system gains the ability to react to the objects and containers of objects that it sees by triggering a specific hardware configuration, software code, business processes, and document generators related to and relevant for the object or subject that is tagged.

One distinctive point of novelty of the invention lies in the fact that the object that is passing through a RFID/RFCT system can determine the hardware and software configuration of said system. This capability does not exist today, whereas the RFID tags are only used to identify the objects passing through the system, the material handling system being statically configured. The present invention can be applied in novel ways to three key areas of RFID systems: (1) hardware, (2) software and (3) information reporting.

Example Hardware Configuration Controls

When the invention is applied to the hardware configuration of an RFID system, for example, novel capabilities that result include the ability to change physical parameters of the system.

RFID Antenna Position, Power and Polarization. RFCT information can be used to determine a new RFID reader antenna position, and to control servo motors to achieve the new position, in order to accurately read RFID tags on smaller items, larger items, or items with weaker or stronger RFID response signals. Moving the antenna may also increase or decrease the coverage area of the RFID reader, to compensate for larger or smaller containers of items to be read.

RFID systems today are rightfully constrained by concerns about the human beings in the process and near the operating equipment. As a result, wattages are kept at a minimum to ensure work safety and worker health. The present invention can use inputs from sensors to measure if a human being is close by and if no one is, can increase the wattage of the RFID reader antennae to enhance read rates and better guarantee read success. As soon as a human being enters the field, the wattage is decreased to standard (e.g. safer) levels again. Sensors such as weight-sensitive floor mats, electric eyes, and passive infrared ("PIR") motion sensors can be utilized to detect the presence of a human operator or user.

Appropriate polarization of the RFID antenna can also improve the accuracy of the reading actions, and as such, certain packaging and arrangements of RFID-tagged items may benefit from having the polarization of the RFID antenna adjusted. Using the RFCT information, the invention can determine that a certain bulk container of RFID-tagged items requires or would benefit from a changed polarization of the RFID-reader antenna, and can command the RFID reader subsystem to rotate or otherwise change the polarization appropriately. Some antennae polarization can be repositioned mechanically, such as by servo motors, while others maybe adjusted electronically, while others have adjustable space diversity, and multiple, selectable antennae in different orientations.

Conveyor Speed. RFCT systems can control the speed of the conveyor system, which is otherwise ordinarily static or fixed. For example, if the RFCT information indicates that a larger than normal bulk package is on the conveyor, then the speed can be decreased to increase the amount of time a bulk package is within range of an RFID reader so that all of the RFID tags contained within the bulk package can be successfully read. Conversely, if a smaller than normal package is determined to be on the conveyor based on the RFCT information, such as a string of individual items on the conveyor instead of the normal cases of items, then the conveyor motor can be sped up in order to allow the individual items to be processed faster whereas they do not need to individually spend as much time as a case of items in the range of the RFID reader.

Video Surveillance. Using human-presence sensors such as those mentioned in the foregoing paragraphs regarding RFID antenna power, video surveillance can be controlled in ways not previously possible. If a camera is present, and if the program logic determines from the RFCT information that video surveillance is to be enabled, a video camera can be commanded to an "ON" state, and its video data stored to memory or disk. But, when the RFCT information and program logic determines that no video surveillance is needed, the camera can be automatically switched off, thereby avoiding use of memory or disk space to store unwanted video data. In this manner, during handling of especially valuable items, especially fragile items, or during times requiring increased tracking and traceability, video surveillance can be selectively engaged. A light stack may also be controlled using similar logic decisions in order to improve video surveillance performance, or to provide automatic illumination of the package or item to be attended to by the human operator. In manner, for example, only certain objects with appropriately encoded RFCTs will trigger video surveillance capture to enable tracking of high-value goods or critical parts with video, while other objects do not require this additional surveillance, and as such, their RFCT's would be coded to disable video surveillance.

Other Sensory Input. Other sensory inputs that can be received by the invention and used decisions to command configuration changes, initiate business processes, and generate documents include, but are not limited to, motion sensors, temperature sensors, humidity sensors, weight sensors, light sensors, and touch or infrared sensors. All of these inputs types can be triggered by reading of an RFCT. For example, the invention can utilize an RFCT to trigger a weight measurement, which may only be needed and initiated on certain packages or cartons, but not on others.

Automatic Selection from Library of Business Processes

In the application of the present invention to the software configuration of an RFID system, novel capabilities result in the way in which the software selectively executes business processes. Without the invention, RFID systems typically execute the same business processes on each item handled through the system, thereby constraining the system to limited uses and utility unless frequent, manual reconfiguration is performed.

One novel application of the invention is that the RFID system is provided with multiplicity of alternative business processes out of which it can choose the best suited business process for handling each item (or bulk of items) based on the RFCT information.

For example, some materials are considered hazardous and will require special handling while others are not. By applying an RFCT to hazardous materials indicating this special processing, the system can engage these special processes automatically when such items are detected in the system, without the need for special human operator input.

A second example is that it may be beneficial to trigger other ad hoc business processes based on the objects that are handled in certain situations. A company might manufacture parts and materials that are sent to a number of customers who all have different quality inspection needs. By applying an appropriately coded RFCT, the system engage a quality process, would stop the current handling of materials (e.g. a shipping transaction), and would prompt the user to perform a quality inspection first. Such an automatic trigger of human interaction can be useful in other materials handling, such as processing imported products, or processing baggage and cargo to be loaded onto high-risk transportation (e.g. airlines, ships, trains, etc.). Such automatic triggering of human intervention is not possible with today's RFID-based handling systems.

Automatic Information Reporting and Sharing. In the application of the invention to the fields of information reporting and sharing, novel capabilities result from placing configuration tags on goods and materials that allow a trigger of specific alerts and reports based on the RFCT's. For example, a configuration tag can be applied to a shipment of goods that will also tell the RFID system that an electronic notification via text messaging (e.g. short message service or "SMS") or email needs to be sent to a specific manager or supervisor.

Relevance to Service Oriented Architecture Computing

In another embodiment of the invention, particular benefits arise in conjunction with International Business Machines' ("IBM") Service Oriented Architecture ("SOA") computing paradigm. The present invention is highly beneficial in embodiments of SOA in that it can be used to trigger a specific service based on RFCT reads. This will, for example, enable a supplier to ship tagged goods to a customer and then provide a business process to the customer based on a tag read event once the goods arrive at their destination.

As previously stated, the RFID identification tag and the RFCT configuration tag can be one and the same or several physical RFID tags. In situations where the identification and configuration tags are contained within one tag, a database would contain knowledge of which configuration to utilize based on reading the unique tag ID. In situations where there are separate identification and configuration tags, the configuration tag will trigger the identification and application of a specific hardware profile, business process or data reporting instruction.

System Arrangement of Components

Figure 6:
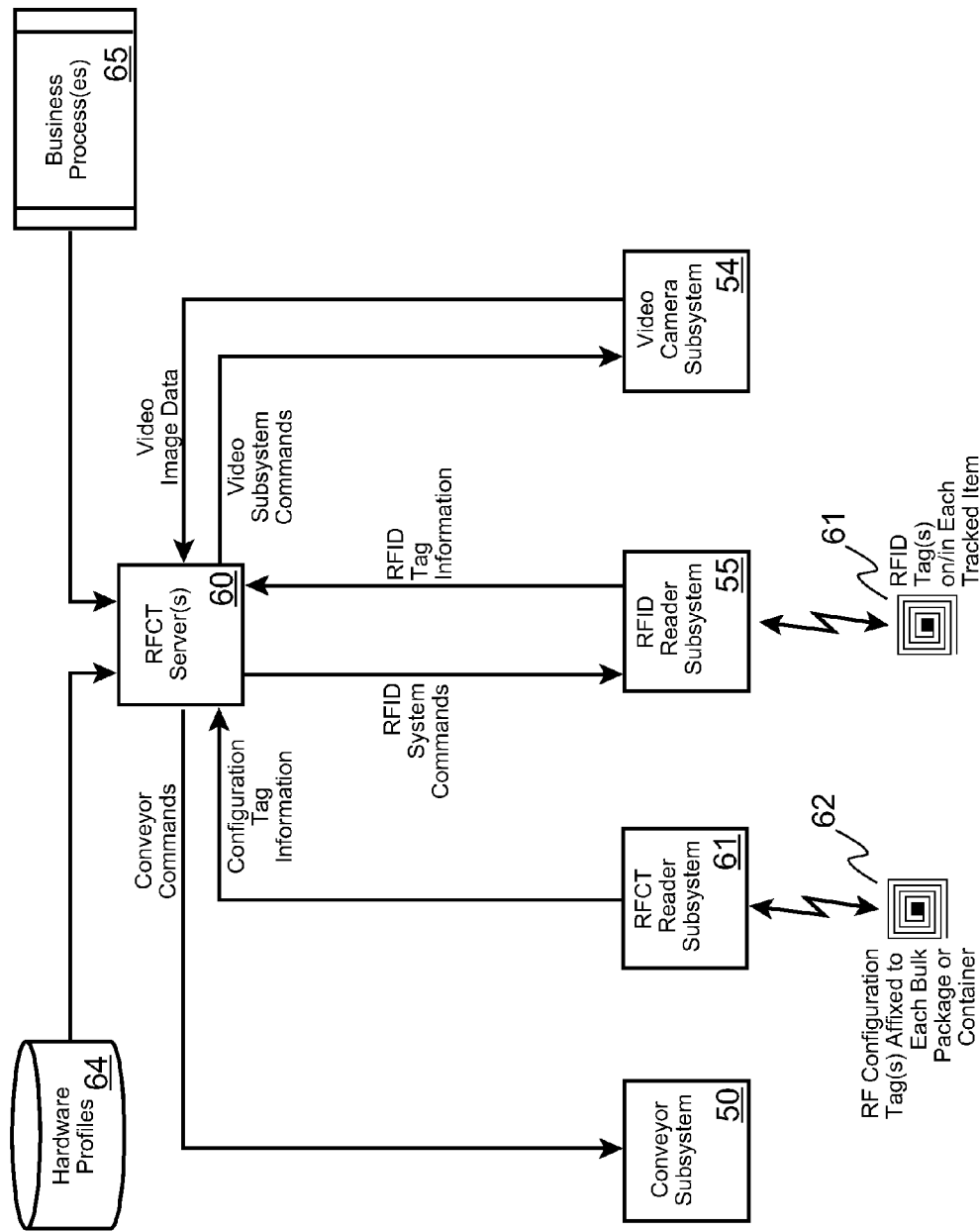
FIG. 6 shows the high-level arrangement of components according to the invention.

FIG. 6 illustrates a high-level arrangement of system components, in which an RFCT Server (60) is interfaced to an RF Configuration Tag Reader Subsystem (63) which is positioned appropriately near the conveyor so as to read the RFCT tags on the packaged items. Configuration tag information is received from the RFCT Reader, and used to retrieve hardware profiles (64), or engage business processes (65), or a combination of both. In practice, the RFCT and RFID tags may be of different types, such as different frequency devices, or one active type device and one passive type device. In such an embodiment, the RFCT Reader Subsystem and the RFID Reader Subsystem would likely be different types of systems, and separate from each other. However, in an alternative embodiment, the RFCT devices and the RFID tags may be of the same type, or may even be the same device (e.g. one device stores both configuration control parameters as well as identification information). Likewise, the RFCT Reader Subsystem and the RFID Reader Subsystem may also be of the same type, or even be the same subsystem, wherein the additional logical processing according to the invention would be implemented to perform typical RFID functions as well as logical processes to perform the RFCT operations as described herein. As discussed in this disclosure, the RFCT is typically, but not necessarily, affixed to the outside of a bulk container of RFID-tagged items, in a position which is more easily accessible to the RFCT reader. Alternatively, however, the RFCT can be affixed to each item, or may be affixed elsewhere to the bulk container (e.g. inside the crate, beneath the lid or behind the door, etc.).

Based on retrieved hardware profiles (64), the conveyor subsystem can be commanded (50), such as to change conveyor speed, an RFID Reader Subsystem (55) can be commanded, such as to change antenna parameters (e.g. polarization, power, position), and a video surveillance subsystem (54) can be commanded, such as to enable video data capture.

By having the RFCT reader read the RFCT tags (62) before the items or packages of items reach the RFID reader (55), the invention is allowed to enact the hardware profiles (64) and/or business processes (65) in time for the items or packages of items to reach the RFID reader.

RFID Tag Hierarchy

Figure 7:
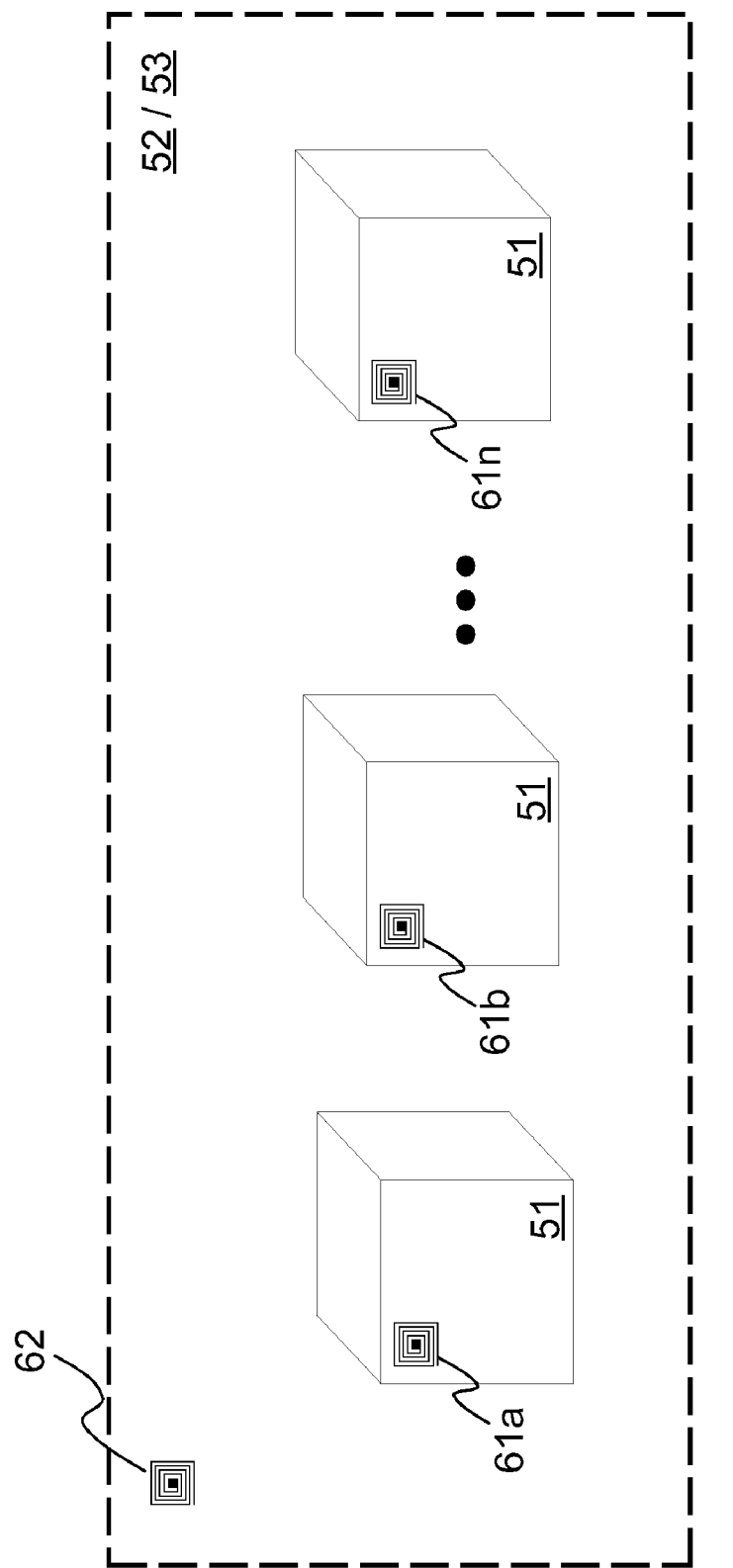
FIG. 7 depicts the association of RF identification tags and RF configuration tags according to the invention.

As previously discussed, a preferred embodiment of the invention allows for an normal RFID tag ($61a$, $61b$, ... $61n$) to be affixed to each item (51), and for a single RF Configuration Tag (62) to be affixed to the bulk container, such as a crate or palletized load of the items (51), as shown in FIG. 7. In this manner, the RFCT controls the hardware configuration and/or engaged business logic for the entire bulk container of items, while continuing to allow for individualized tracking of the items, such as tracking by serial numbers.

Figure 8:
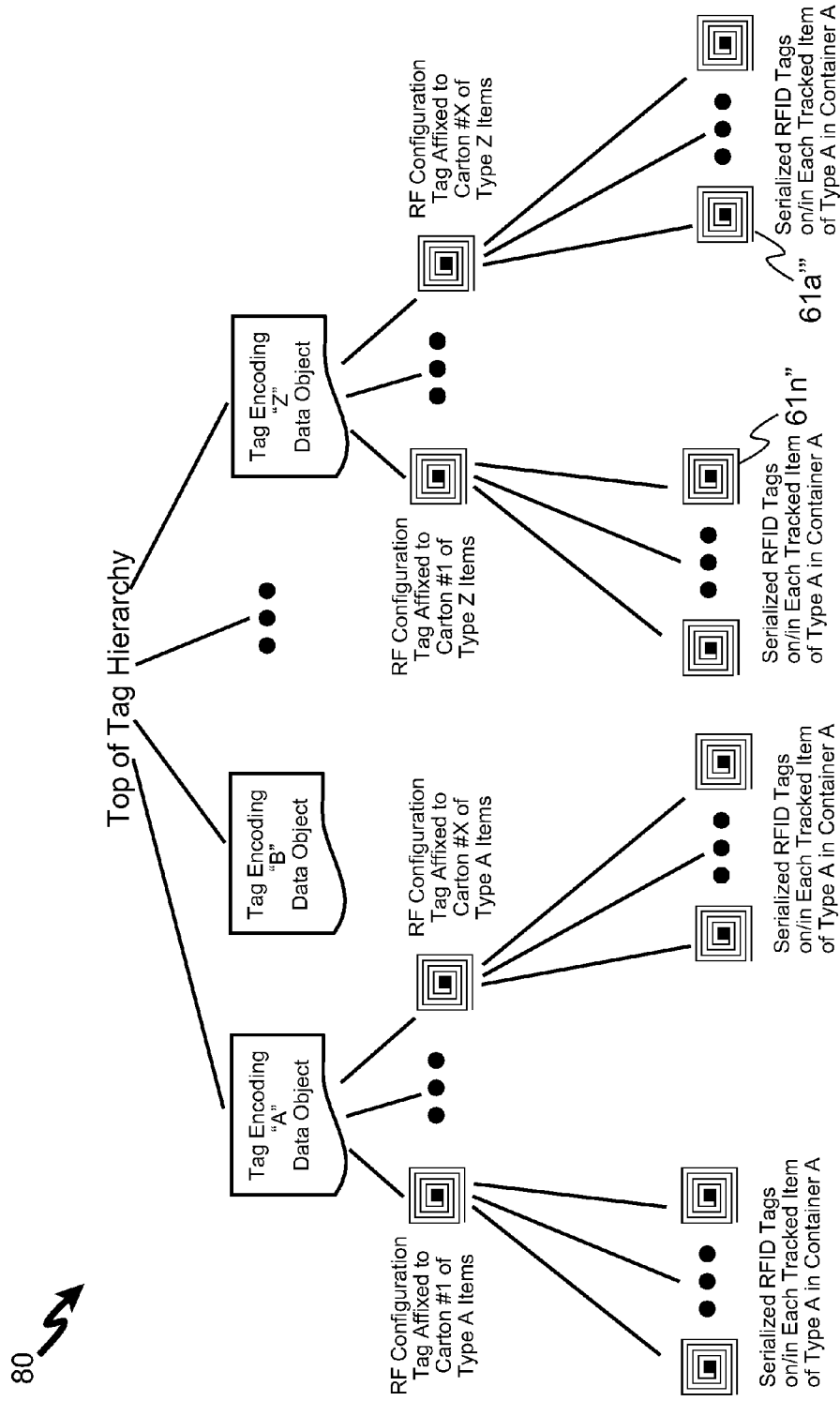
FIG. 8 illustrates the hierarchy of information and devices per the present invention.

From a data organization viewpoint, this creates a tag hierarchy (80), as illustrated in FIG. 8. In this figure, there are several data objects which represent information to select a RFID Reader hardware profiles and/or business processes. The appropriate data object is programmed into an RFCT tag for attachment to a bulk container of items. The RFCT can also be serialized to identify the specific carton, crate, or bulk of items.

Individual item RFID tags are also utilized, typically each being serialized and programmed with information to identify the item (make, model, manufacturing date, etc.)

This hierarchy allows for multiple "types" of items to be handled according to their "type", for each bulk package of items to be tracked individually (by bulk container serial number), and for each individual item to be tracked, as well.

Generalized Logical Process

Figure 1:
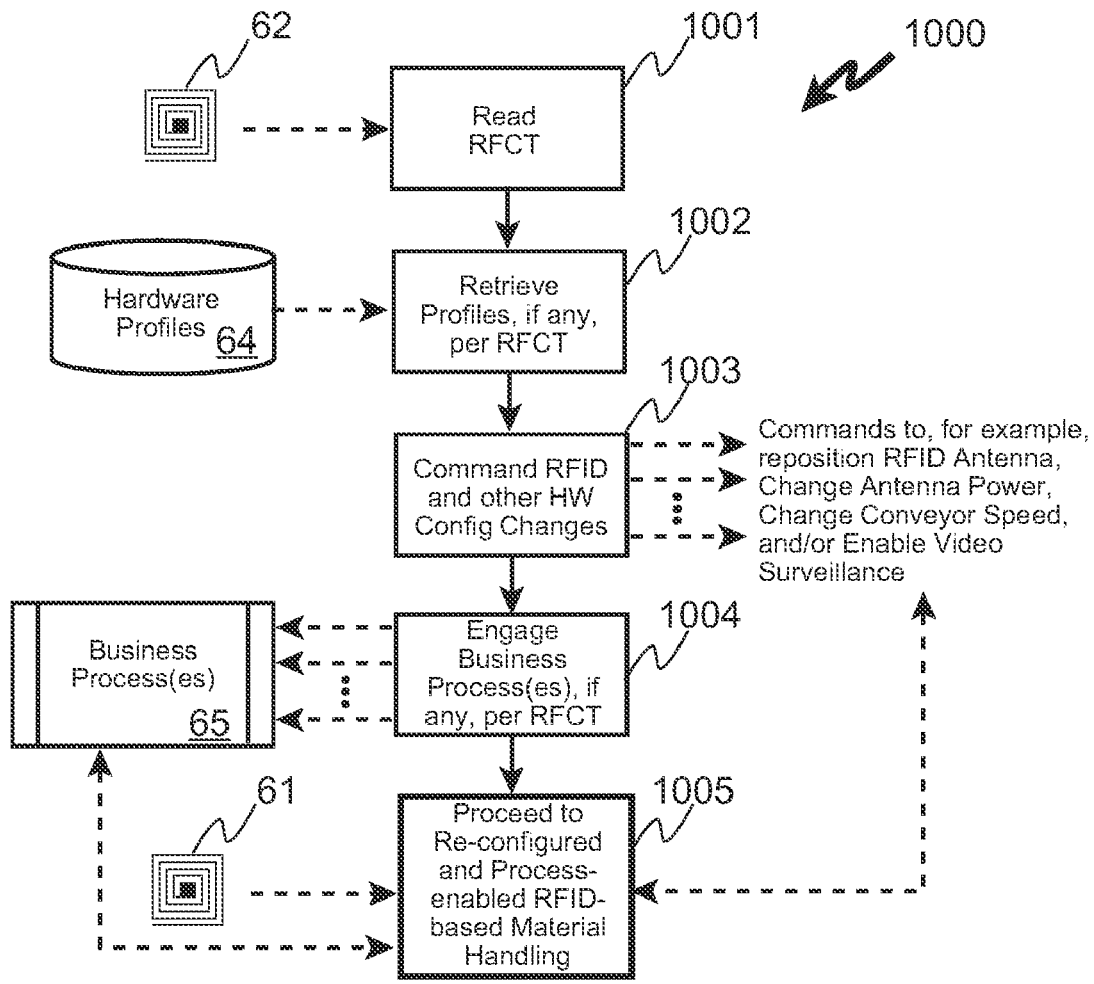
FIG. 1 sets forth a generalized logical process according to the invention.

Turning to FIG. 1, an generalized logical process according to the present invention is shown, in which a Radio Frequency Configuration Tag ("RFCT") (62) is read (1001). Based upon the RFCT information, one or more hardware profiles (64) are retrieved (1002), and appropriate commands (1003) are sent to system components to reconfigure the material handling system to handle the item type identified by the RFCT.

Then, one or more business processes (65) are engaged (1004), one or more document generators are started, or both, depending on the contents of the RFCT, to complete the customization of the material handling for the item type identified by the RFCT. Finally, RFID tag reading (1005) of the individual item RFID tags (61) is performed under the reconfigured conditions, and using the engaged business processes.

One or more documentation processes may also be automatically engaged, as mentioned in previous paragraphs, such as production of special documents for export paperwork, or production of quality traceability documents.

In yet other embodiments, the invention may perform any combination of automatic reader hardware configuration changes, business process initiation, and document production. For example, in one embodiment, certain business processes and document generators can be automatically initiated without implementation of changes to the reader hardware.

Suitable Computing Platform

In one embodiment of the invention, the functionality of the RFID reading and material handling system, including the previously described logical processes, are performed in part or wholly by software executed by a computer, such as personal computers, web servers, web browsers, or even an appropriately capable portable computing platform, such as personal digital assistant ("PDA"), web-enabled wireless telephone, or other type of personal information management ("PIM") device. In alternate embodiments, some or all of the functionality of the invention are realized in other logical forms, such as circuitry.

Therefore, it is useful to review a generalized architecture of a computing platform which may span the range of implementation, from a high-end web or enterprise server platform, to a personal computer, to a portable PDA or web-enabled wireless phone.

Figure 2A:
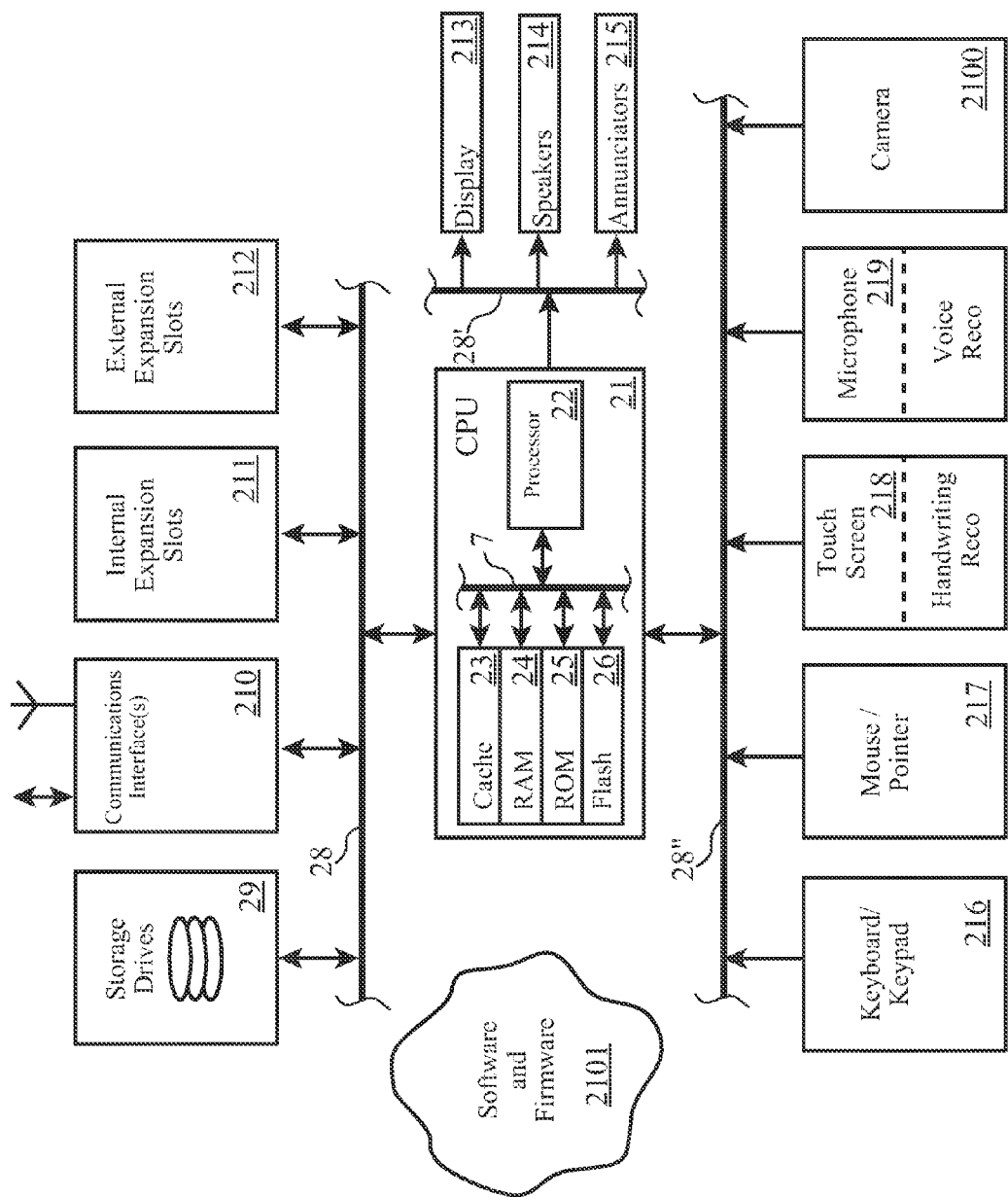
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
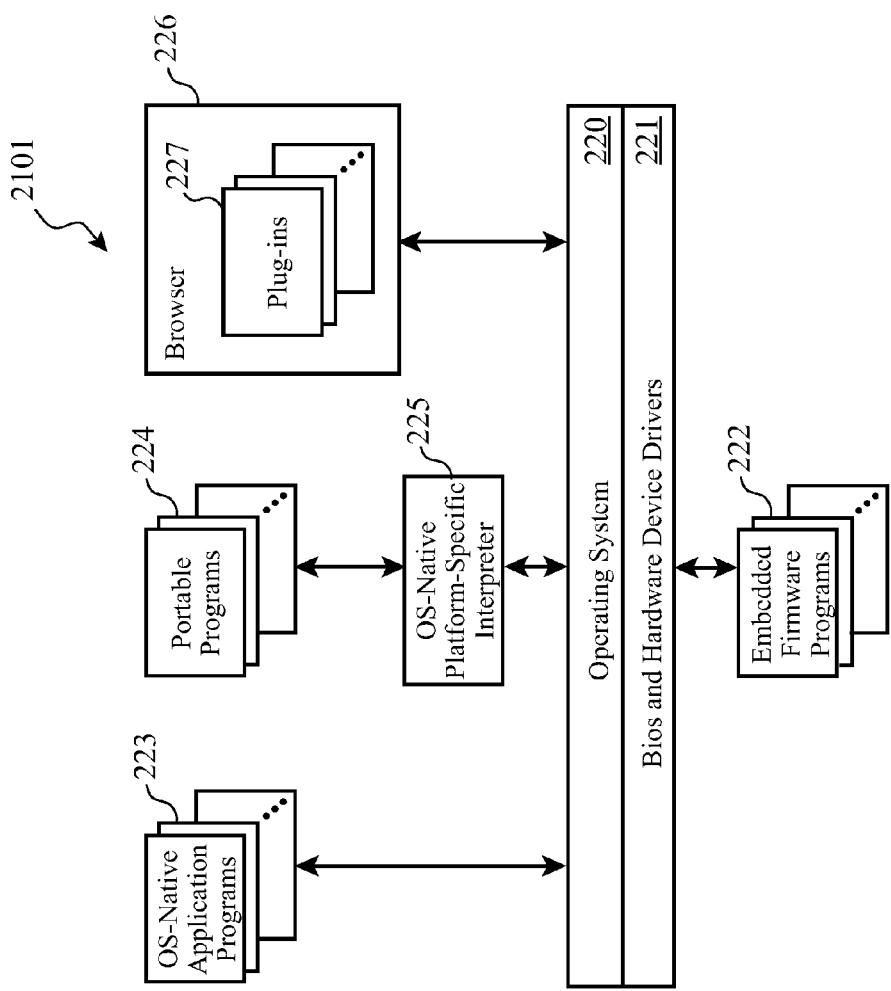

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Service-based Embodiments

Alternative embodiments of the present invention include some or all of the foregoing logical processes and functions of the invention being provided by configuring software, deploying software, downloading software, distributing software, or remotely serving clients in an on demand environment.

Software Deployment Embodiment. According to one embodiment of the invention, the methods and processes of the invention are distributed or deployed as a service by a service provider to a client's computing system(s).

Figure 3A:
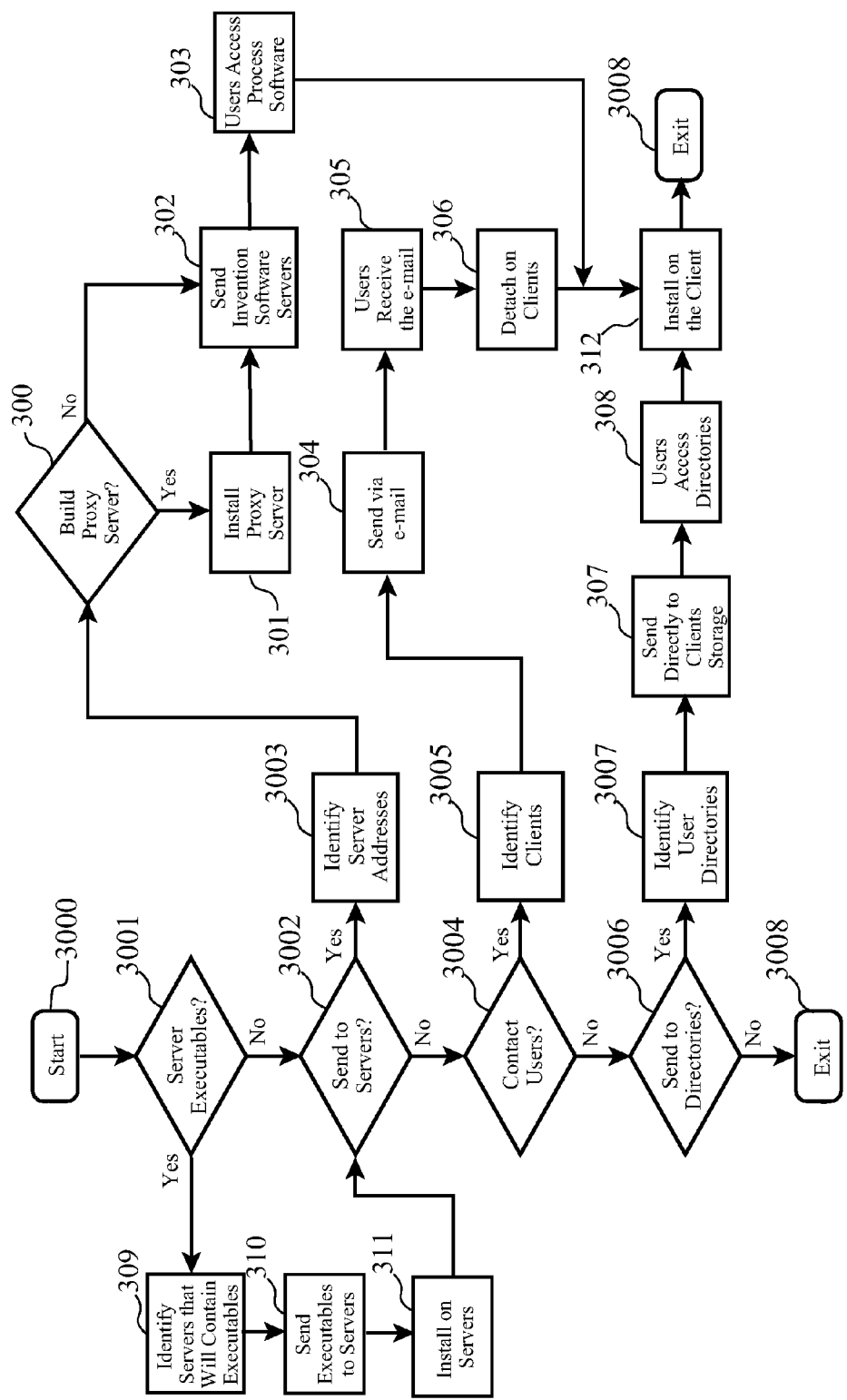
FIG. 3a sets forth a logical process to deploy software to a client in which the deployed software embodies the methods and processes of the present and related inventions.

Turning to FIG. 3a, the deployment process begins (3000) by determining (3001) if there are any programs that will reside on a server or servers when the process software is executed. If this is the case, then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers, then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as, but not limited to, sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
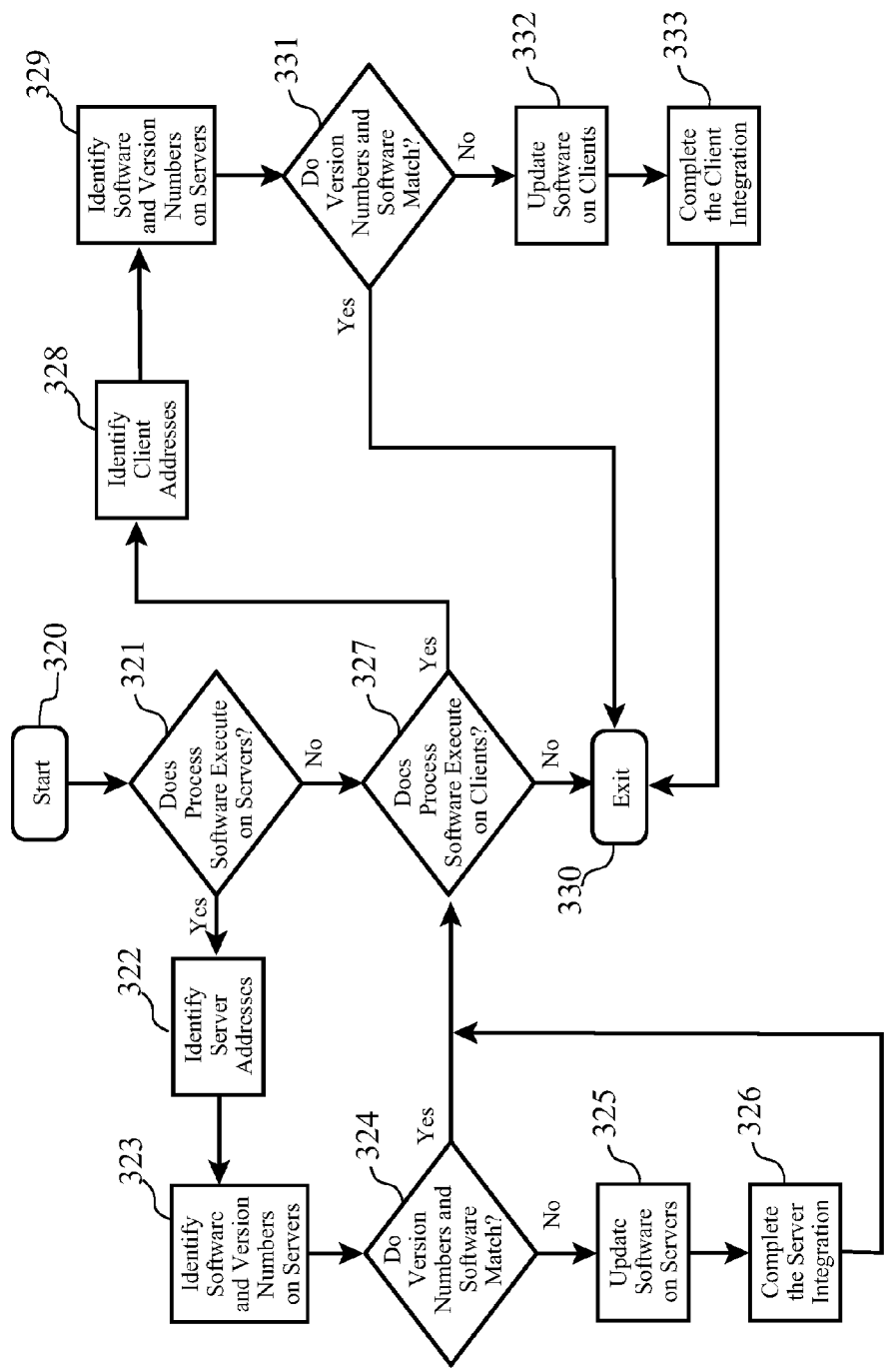
FIG. 3b sets forth a logical process to integrate software to other software programs in which the integrated software embodies the methods and processes of the present and related inventions.

Turning to FIG. 3*b*, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match, then processing continues (327). Otherwise, if one or more of the version numbers do not match, then the unmatched versions are updated on the server or servers with the correct versions (325). Additionally, if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients, the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

Application Programming Interface Embodiment. In another embodiment, the invention may be realized as a service or functionality available to other systems and devices via an Application Programming Interface ("API"). One such embodiment is to provide the service to a client system from a server system as a web service.

On-Demand Computing Services Embodiment. According to another aspect of the present invention, the processes and methods disclosed herein are provided through an on demand computing architecture to render service to a client by a service provider.

Figure 3C:
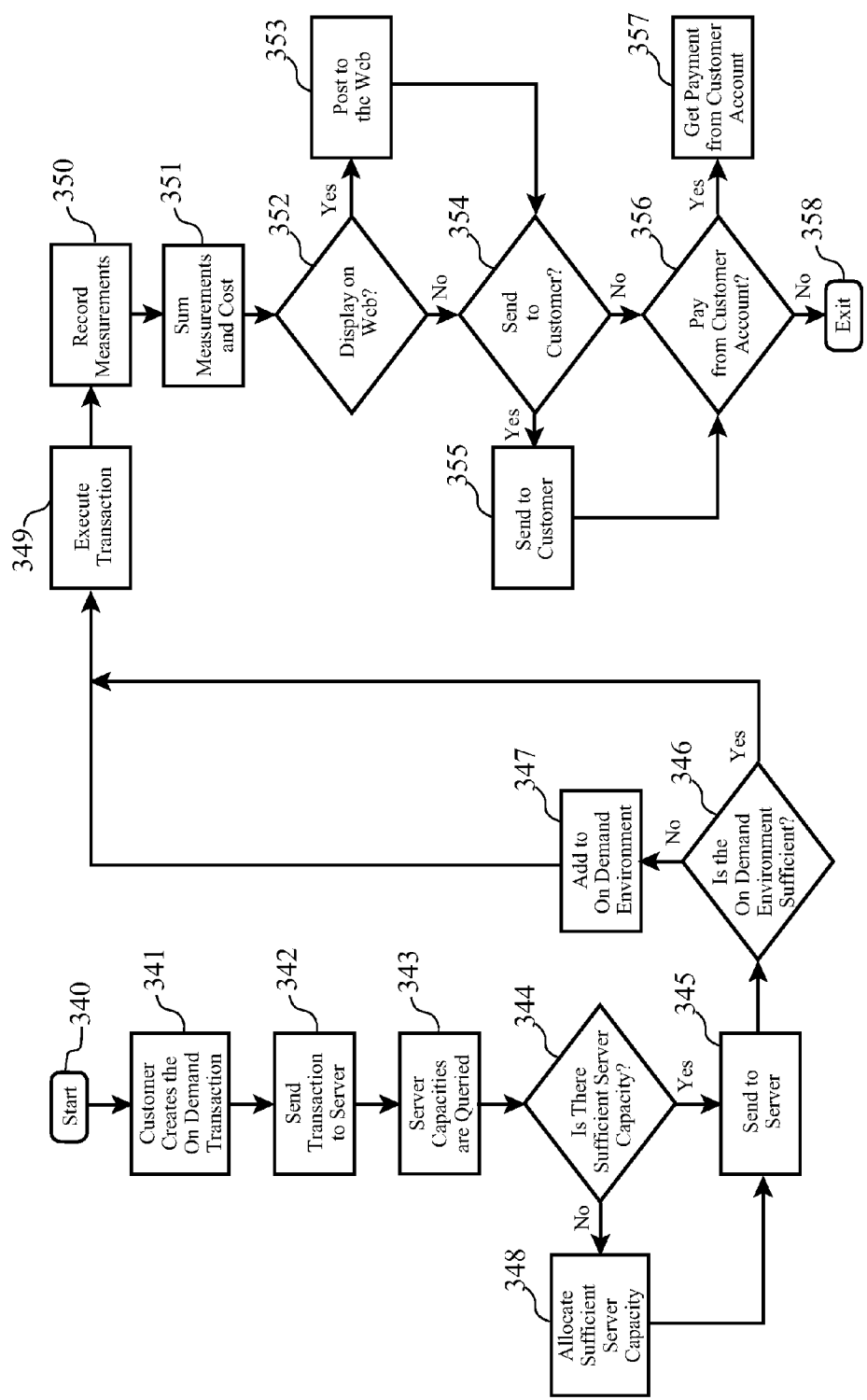
FIG. 3c sets forth a logical process to execute software on behalf of a client in an on-demand computing system, in which the executed software embodies the methods and processes of the present and related inventions.

Turning to FIG. 3*c*, generally speaking, the process software embodying the methods disclosed herein is shared, simultaneously serving multiple customers in a flexible, automated fashion. It is standardized, requiring little customization and it is scaleable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise, when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On-Demand environment the main server can initially be the only server, then as capacity is consumed other servers are added to the On-Demand environment.

The server central processing unit ("CPU") capacities in the On-Demand environment are queried (343). The CPU requirement of the transaction is estimated, then the servers available CPU capacity in the On-Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity, then the transaction is sent to a selected server (345).

Before executing the transaction, a check is made of the remaining On-Demand environment to determine if the environment has sufficient available capacity for processing the transaction. This environment capacity consists of such things as, but not limited to, network bandwidth, processor memory, storage etc. (345). If there is not sufficient available capacity, then capacity will be added to the On-Demand environment (347). Next, the required software to process the transaction is accessed, loaded into memory, then the transaction is executed (349).

The usage measurements are recorded (350). The usage measurements consists of the portions of those functions in the On-Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On-Demand costs be posted to a web site (352), then they are posted (353). If the customer has requested that the On-Demand costs be sent via e-mail to a customer address (354), then they are sent (355). If the customer has requested that the On-Demand costs be paid directly from a customer account (356), then payment is received directly from the customer account (357). The last step is to exit the On-Demand process.

Grid or Parallel Processing Embodiment. According to another embodiment of the present invention, multiple computers are used to simultaneously process individual audio tracks, individual audio snippets, or a combination of both, to yield output with less delay. Such a parallel computing approach may be realized using multiple discrete systems (e.g. a plurality of servers, clients, or both), or may be realized as an internal multiprocessing task (e.g. a single system with parallel processing capabilities).

VPN Deployment Embodiment. According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
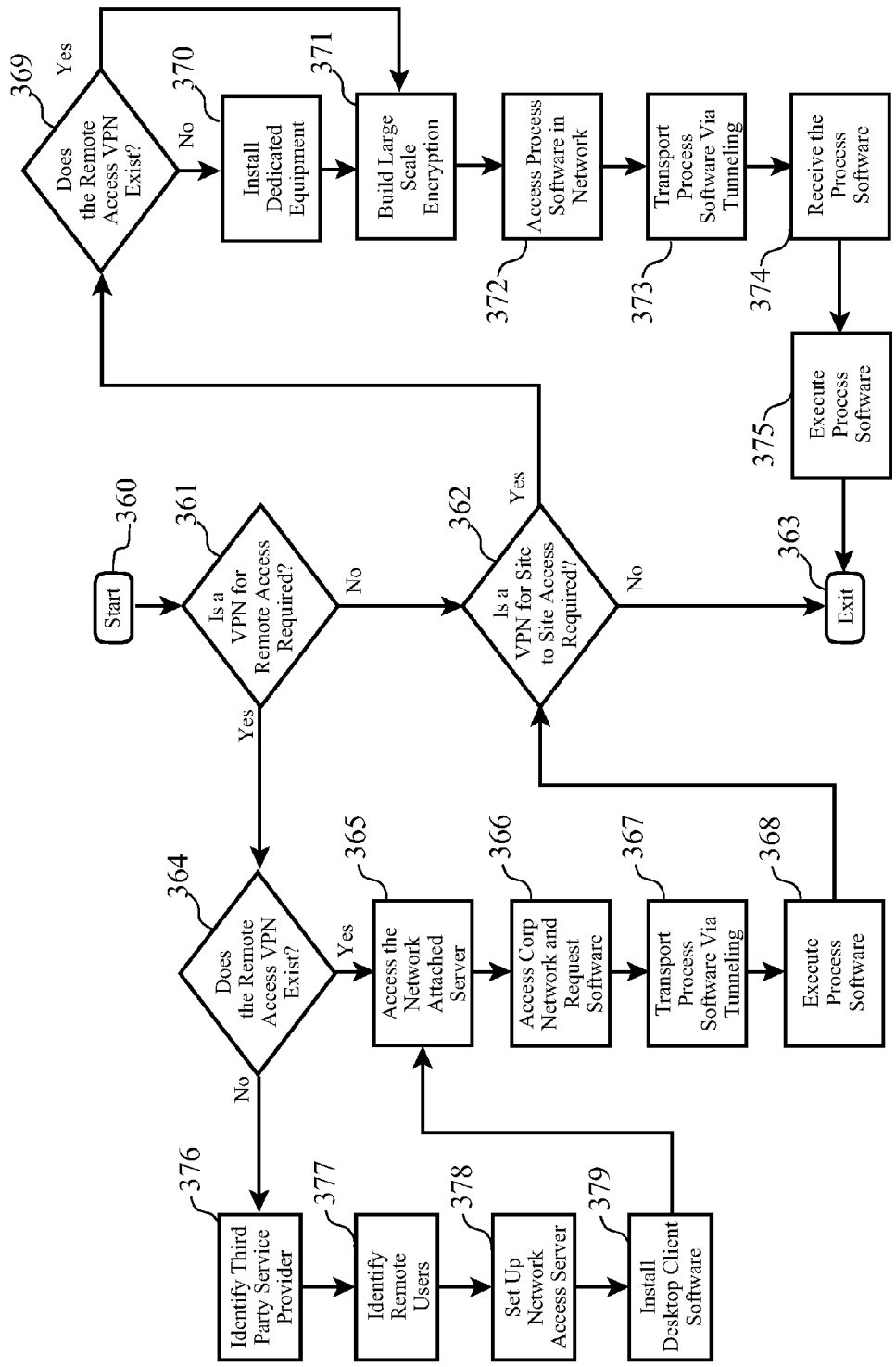
FIG. 3d sets forth a logical process to deploy software to a client via a virtual private network, in which the deployed software embodies the methods and processes of the present and related inventions.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then, build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
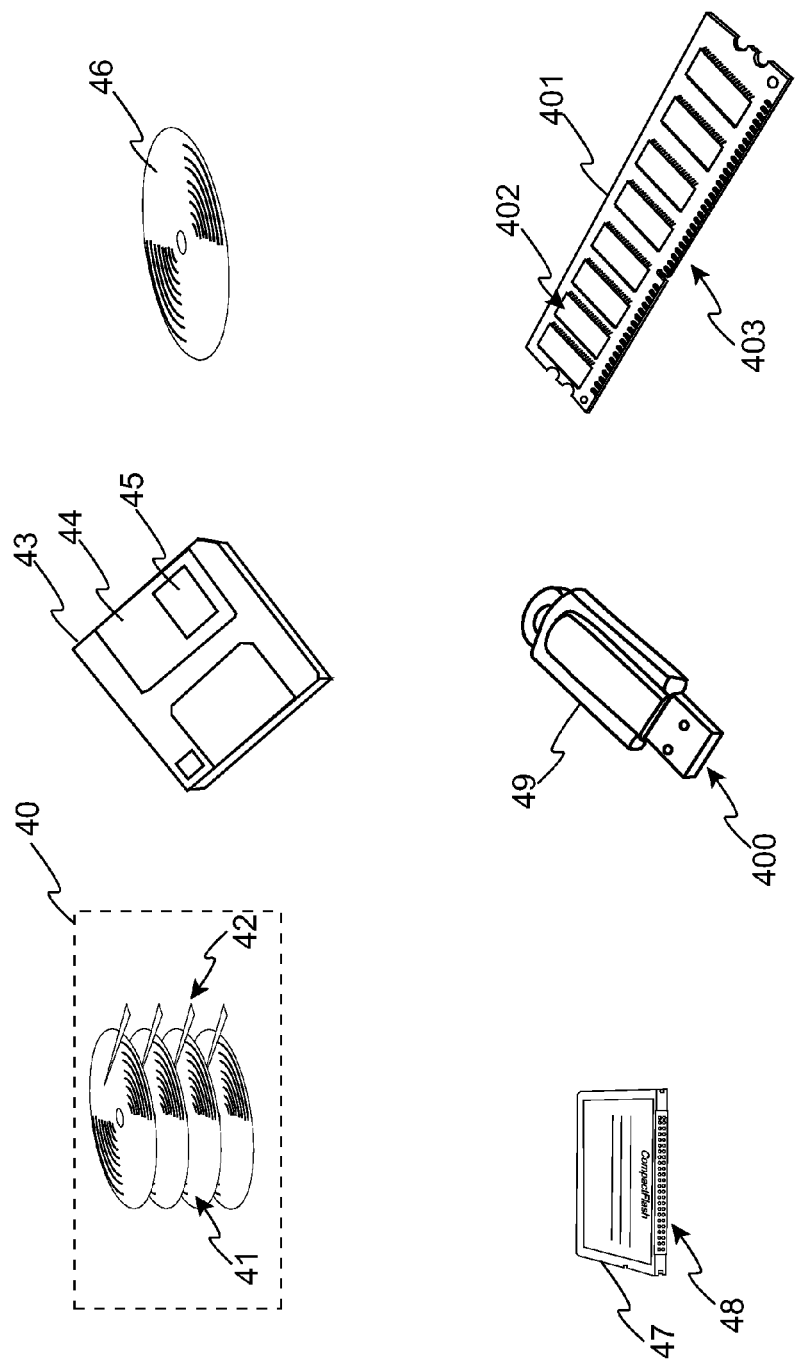
FIGS. 4a, 4b and 4c, illustrate computer readable media of various removable and fixed types, signal transceivers, and parallel-to-serial-to-parallel signal circuits.

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
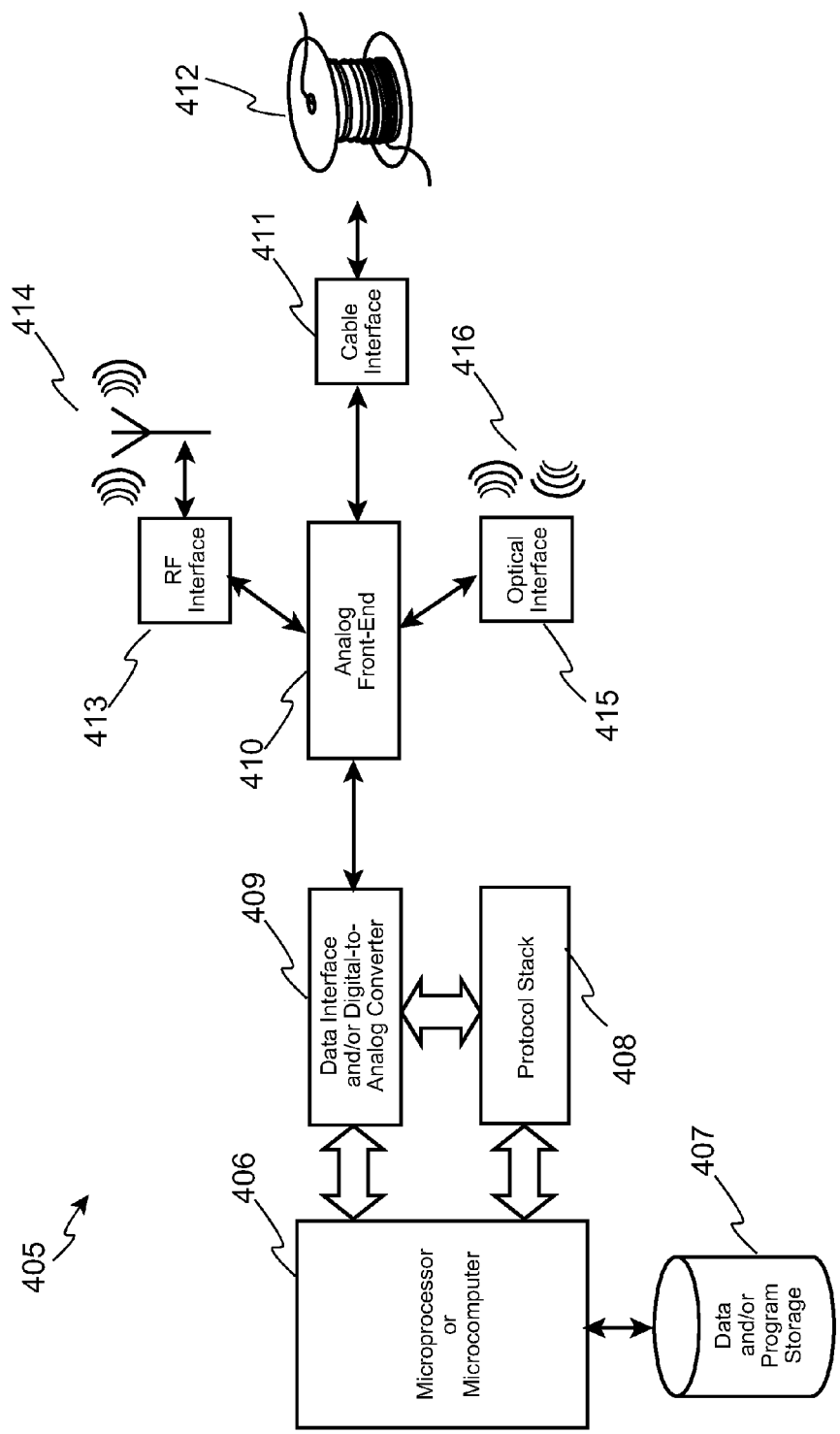

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4*b* may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-peripheral embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
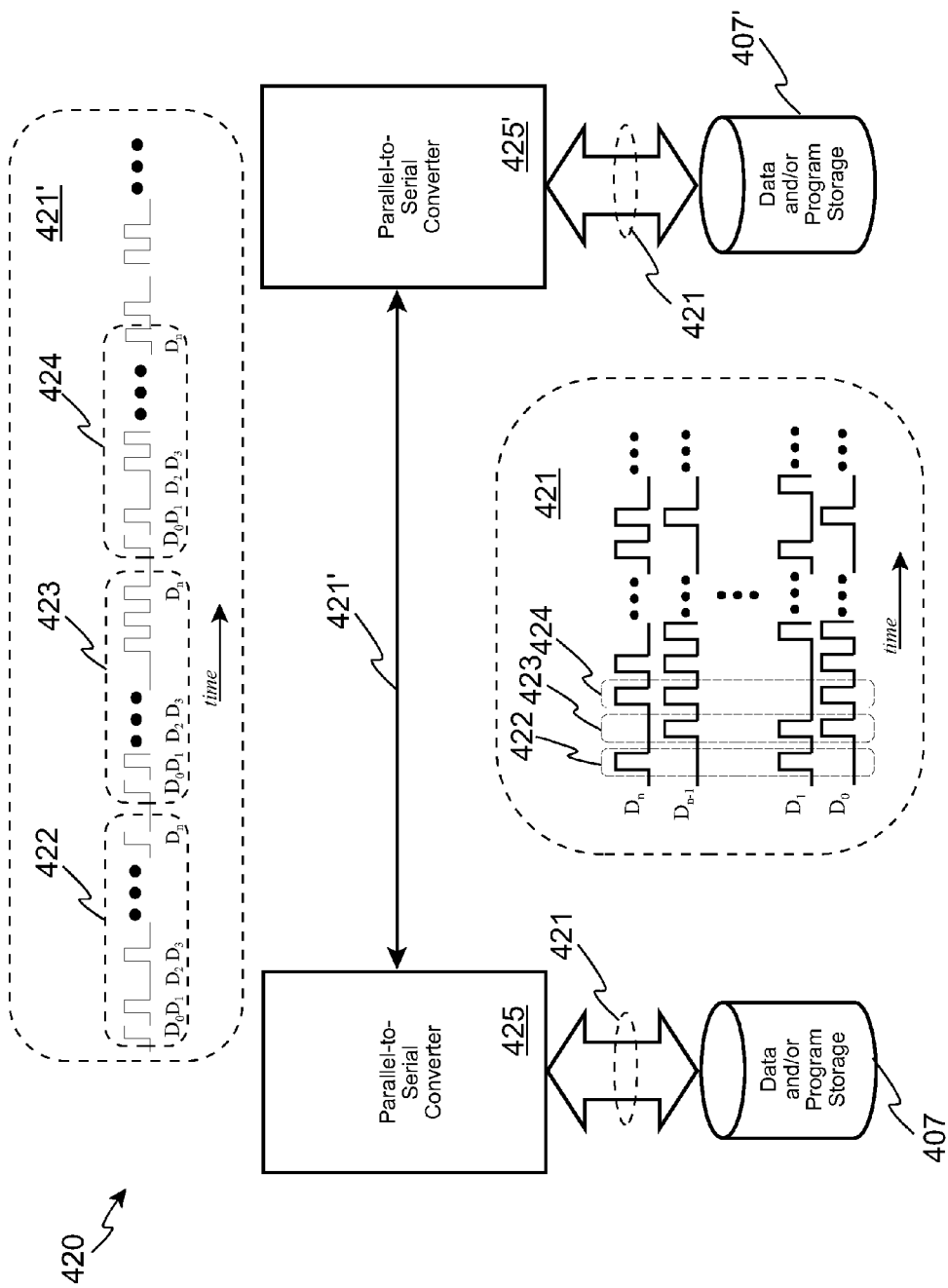

FIG. 4*c* illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as a RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n-1. In some systems, Do is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4*c* may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

Conclusion

While certain examples and details of a preferred embodiment have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. A system for initiation of selected document generators in a real-time flow of material handling, the system comprising:
   a radio-frequency-readable configuration tag physically associated with one or more articles in a physical handling flow, the configuration tag storing and selectively transmitting one or more configuration control parameters, the articles having at least one radio-frequency-readable identification tag;
   a configuration tag reader positioned prior to a radio frequency identification tag reader in the flow of articles to read the configuration control parameters from the configuration tag responsive to the article passing in the flow; and
   a commander configured to receive the configuration control parameters from the configuration tag via the configuration tag reader, to select an automatic document generator according to the received configuration control parameters, and to engage the selected document generator.

2. The system as set forth in claim 1 wherein the configuration tag is associated with a container for a plurality of the articles, and where each of the articles in the container is provided with an identification tag.

3. The system as set forth in claim 1 wherein the document generator is configured to generate an electronic mail message.

4. The system as set forth in claim 1 wherein the document generator is configured to generate a facsimile message.

5. The system as set forth in claim 1 wherein the document generator is configured to generate a human-readable handling instruction document.

6. The system as set forth in claim 1 wherein the document generator is configured to generate a quality control document.

7. The system as set forth in claim 1 wherein the document generator is configured to generate a traceability document.

8. The system as set forth in claim 1 wherein the document generator is configured to generate a shipping document.

9. The system as set forth in claim 8 wherein the shipping document comprises a manifest.

10. The system as set forth in claim 1 wherein the commander is further configured to retrieve one or more identification tag reader hardware profiles, and to command a hardware configuration of the identification tag reader.

11. The system as set forth in claim 10 wherein the hardware configuration change comprises at least one change selected from the group consisting of a position adjustment for an antenna of the identification tag reader, a radio signal power level for an antenna of the identification tag reader, a speed of travel control of a material handler for the handling flow, a polarization option of an antenna of the identification tag reader, and enabling video surveillance of an area of handling of the articles.

12. The system as set forth in claim 1 wherein the commander comprises one or more sensor inputs for receiving sensor signals from a sensor selected from the group consisting of a motion sensor, a weight-sensitive floor mat, a temperature sensor, a light sensor, a touch sensor, and a humidity sensor, and wherein the commander is further configured to utilize the sensor inputs in order to perform one or more actions selected from the group consisting of commanding a change in a hardware configuration of the identification tag reader, initiate a business process, and engage a document generator.

13. The system as set forth in claim 1 wherein the commander is further configured to initiate one or more computer-based business processes according to the received configuration control parameters.

14. The system as set forth in claim 13 wherein the engaged business process comprises a business process selected from the group consisting of a business processes responsive to user presence, a quality control business process, a quality traceability process, a theft prevention process, and a hazardous materials handling process.

15. A method for initiation of selected document generators in a real-time flow of material handling, the method comprising:
    physically associating a radio-frequency-readable configuration tag with one or more articles in a physical handling flow, the configuration tag storing and selectively transmitting one or more configuration control parameters, the articles having at least one radio-frequency-readable identification tag;
    providing a configuration tag reader device positioned prior to a radio frequency identification tag reader in the flow of articles to read the configuration control parameters from the configuration tag responsive to the article passing in the flow;
    receiving by a commander device the configuration control parameters from the configuration tag via the configuration tag reader;
    selecting by the commander device an automatic document generator process according to the received configuration control parameters; and
    engaging the selected document generator process.

16. The method as set forth in claim 1 wherein associating a configuration tag comprises associating a configuration tag with a container for a plurality of the articles, and wherein each of the articles in the container is provided with an identification tag.

17. The method as set forth in claim 1 further comprising generating at least one document by the document generator process selected from the group consisting of an electronic mail message, a facsimile message, a human-readable handling instruction document, a quality control document, a traceability document, a shipping document and a manifest.

18. The method as set forth in claim 1 further comprising retrieving by a reader device one or more identification tag reader hardware profiles selected by the received configuration control parameters, and commanding by a commander device a hardware configuration of the identification tag reader according to the retrieved profile.

19. The method as set forth in claim 1 further comprising initiating one or more computer-based business processes according to the received configuration control parameters.

20. A computer-readable storage memory device encoded with executable program instruction for initiation of selected document generators in a real-time flow of material handling, comprising:
    computer program code stored on said computer-readable storage medium, configured to cause a processor to perform the steps of:
    interface a configuration tag reader positioned prior to a radio frequency identification tag reader in a physical handling flow of articles, the articles having a physically associated radio-frequency-readable configuration tag, the configuration tag storing and selectively transmitting one or more configuration control parameters to the configuration tag reader, the articles having at least one radio-frequency-readable identification tag;
    receive by a commander via the configuration tag reader interface the configuration control parameters;
    select by said the commander an automatic document generator according to said the received configuration control parameters; and
    engage the selected document generator.

* * * * *